United States Patent [19]
Volin

[11] Patent Number: 4,648,615
[45] Date of Patent: Mar. 10, 1987

[54] WHEELCHAIR WIDTH ADJUSTER

[76] Inventor: Frank Volin, 3221 Quitman St., Columbia, S.C. 29402

[21] Appl. No.: 795,408

[22] Filed: Nov. 6, 1985

Related U.S. Application Data

[63] Continuation-in-part of Ser. No. 554,288, Nov. 22, 1983, abandoned.

[51] Int. Cl.[4] .......... B62M 1/14

[52] U.S. Cl. .......... 280/242 WC; 280/289 WC; 280/42; 280/650; 280/657; 297/338

[58] Field of Search .......... 280/650, 289 WC, 242 WC, 280/647, 649, 42, 657; 74/501 R, 506; 254/387, 120, 4 R, 4 B, 4 C, 8 R, 8 B, 8 C; 297/338, 339; 108/147

[56] References Cited

U.S. PATENT DOCUMENTS

| | | | |
|---|---|---|---|
| 767,275 | 8/1904 | Houston | 254/387 |
| 891,894 | 6/1908 | Wortman | 74/506 |
| 1,308,363 | 7/1919 | Kuehne | 74/506 |
| 2,524,597 | 2/1958 | Lerman | 280/242 WC |
| 2,551,097 | 5/1951 | Cole | 254/8 R |
| 3,122,395 | 2/1964 | Offner | 297/DIG. 4 |
| 3,250,513 | 5/1966 | Fenner | 254/9 |
| 3,331,614 | 7/1967 | McClintock | 280/42 |
| 3,534,880 | 9/1968 | Washburn | 254/4 R |
| 3,788,424 | 1/1974 | Chabot | 254/4 R |
| 3,893,679 | 7/1975 | Sumrall | 280/513 |
| 4,085,946 | 4/1978 | Krupp | 280/289 WC |

*Primary Examiner*—John J. Love
*Assistant Examiner*—Richard Camby
*Attorney, Agent, or Firm*—B. P. Fishburne, Jr.

[57] ABSTRACT

A low effort high mechanical advantage occupant-operated rotary lever near one arm rest of a folding wheelchair is connected through a short cable to a longitudinal seat frame member of the wheelchair. Manual rotation of the lever in one direction effects narrowing of the wheelchair sufficiently to allow passage through restricted areas.

5 Claims, 7 Drawing Figures

WHEELCHAIR WIDTH ADJUSTER

CROSS-REFERENCE TO RELATED APPLICATION

This application is a continuation-in-part of prior copending application Ser. No. 06/554,288, filed Nov. 22, 1983, for WHEELCHAIR WIDTH ADJUSTER, now abandoned.

BACKGROUND OF THE INVENTION

U.S. Pat. No. 2,824,597 and others show devices applicable to laterally folding wheelchairs to narrow them sufficiently for passage through restricted doorways and the like. Mechanical devices of this kind in the prior art have tended to be somewhat costly and bulky, and their use adds significantly to the weight of the wheelchair. Some such devices are not readily adaptable to all makes of folding wheelchairs, and some are not suitable to be embodied in an attachment kit for installation on the wheelchair by its owner or user.

Accordingly, the object of this invention is to provide a greatly simplified, low cost, minimum effort wheelchair attachment which can be installed on a chair readily by its owner or user. The device adds only insignificant weight to the chair, is sturdy and durable, and can be operated in most cases by the handicapped.

A further object of the invention is to provide an improved mechanical-type wheelchair width regulating attachment which has an increased mechanical advantage and a decreased operating force or effort compared to the known prior art.

Another object is to provide a wheelchair attachment of the above type having minimum bulkiness and embodying a minimum number of simple parts.

DETAILED DESCRIPTION

Figure 1:
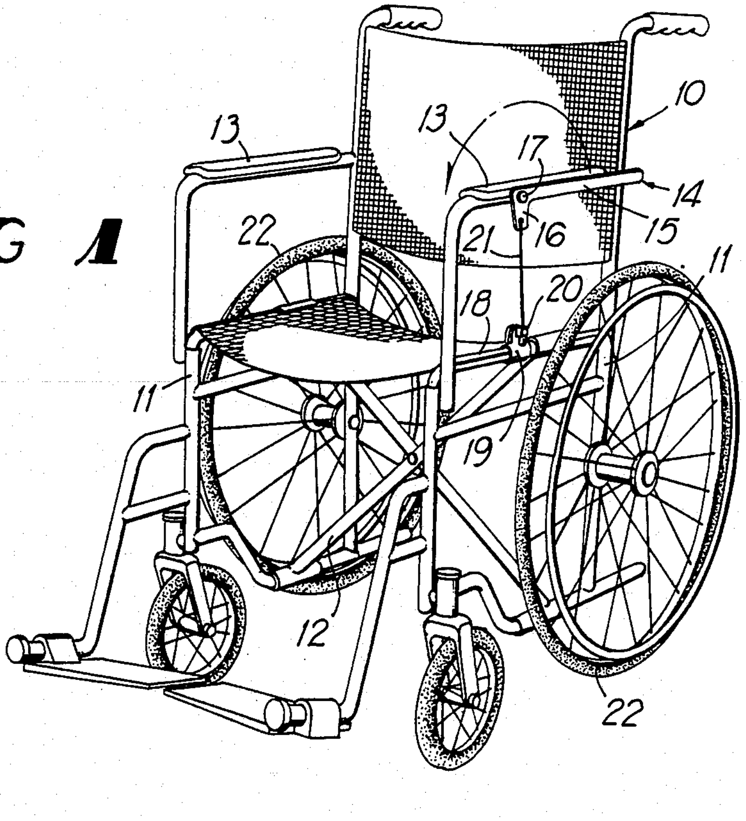
FIG. 1 is a perspective view of a conventional folding wheelchair having a width reducing device according to the present invention.

Referring to the drawings in detail wherein like numerals designate like parts, a standard laterally folding wheelchair 10 is illustrated having spaced upright frame sides 11 interconnected by a folding X-frame 12. The frame sides 11 include arm rests 13.

A device for decreasing the width of the wheelchair 10 according to the invention, and forming the main subject matter of the invention, comprises a single bell crank lever 14 having a straight elongated manual lever arm 15 which is preferably about 12" in length for maximum efficiency. A much shorter right angular actuating arm 16 is carried by the manual lever arm at its forward end, and preferably the actuating lever arm 16 is about 2" long. This particular construction of the bell crank lever 14 imparts to it a mechanical advantage of approximately 12 in the device according to the invention, as will be further discussed. The bell crank lever 14 is pivotally attached to one chair arm rest 13 by a transverse pivot element 17 disposed somewhat forwardly of the longitudinal center of the arm rest. The bell crank lever 14, which is preferably slender and flat, lies close to the outer side of the arm rest to assure minimum bulkiness.

Directly below the pivot element 17 on one fore and aft seat tube 18 of the folding wheelchair is a tube clamp 19 of the split type secured by a clamp bolt 20. A short length of nylon cable 21, or an equivalent element, is connected between the short actuating lever arm 16 and the clamp bolt 20, as shown in the drawings. The simplified lightweight compact chair width control mechanism is installed on one side only of the wheelchair as illustrated.

Figure 3:
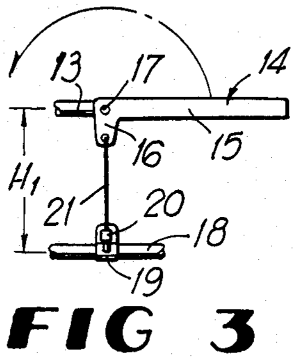
FIG. 3 is a fragmentary side elevation of the width control attachment according to the invention in the full chair width position.
Figure 4:
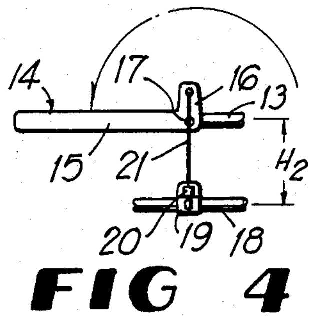
FIG. 4 is a similar view of the attachment or device in the reduced chair width position.

In operation, the wheelchair occupant, or another person, if required, grasps the manual lever arm 15 while it is in the normal full chair width horizontal rearwardly extending position shown in FIGS. 1 and 3. The bell crank lever 14 is then rotated forwardly a full 180° to the position shown in FIG. 4 where the lever arm 15 is horizontal and forwardly extending from its pivot 17. The axis of the pivot element 17 will then have a dead center relationship with the cable 21 and its attachment point to the actuating lever arm 16, FIG. 4, so that the device will be stable in the chair width reducing position.

Figure 2:
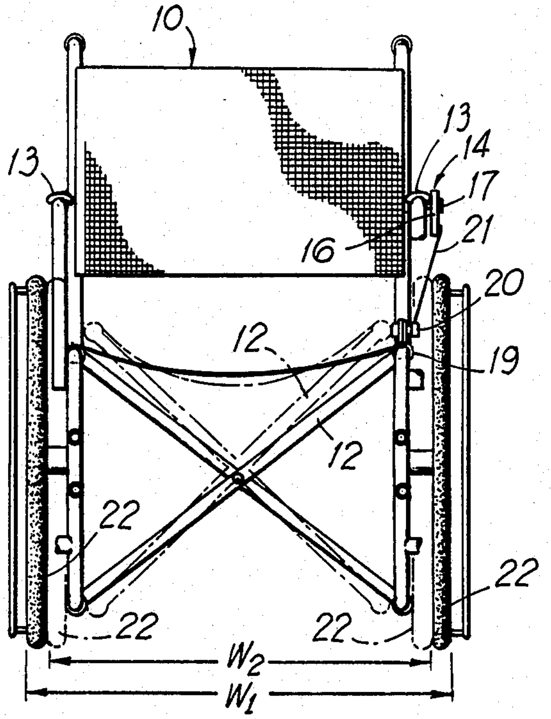
FIG. 2 is a front elevation of the wheelchair with parts omitted showing its normal full width and reduced width under control of the invention.

When the bell crank 14 is thus operated, the chair X-frame 12 is partly folded and assumes the approximate position shown in phantom lines in FIG. 2. Correspondingly, the width of the chair is reduced so that its main wheels 22 assume the approximate positions shown in phantom lines shown in FIG. 2. The full width and reduced width conditions of the wheelchair are indicated by $W_1$ and $W_2$ in FIG. 2. Correspondingly, the vertical spacing of the seat tube 18 and arm rest 13 when the chair is at full width and reduced width is indicated at $H_1$ and $H_2$, FIGS. 3 and 4, respectively.

With the mechanism constructed as described, it will require only about 16.7 pounds of force exerted on the lever arm 15, with a mechanical advantage of 12, to move the bell crank from the full chair width position of FIG. 3 to the mid-position, not shown, where the mechanical advantage of the system is reduced to about 6. At this point, where the mechanical lever arm 15 will be vertical, it requires roughly 33 pounds of pressure to move the bell crank 14 to the chair width reduced position shown in FIG. 4. In this final portion of the rotation of the bell crank 14 on its pivot, the mechanical advantage of the system will increase back to 12 when the chair assumes the reduced width $W_2$.

The device of the invention is extremely simple and inexpensive, it is easy to install on virtually any make of folding wheelchair. It adds almost no discernible weight to the chair and can be readily operated by even the severely handicapped due to its minimum effort construction.

Figure 5:
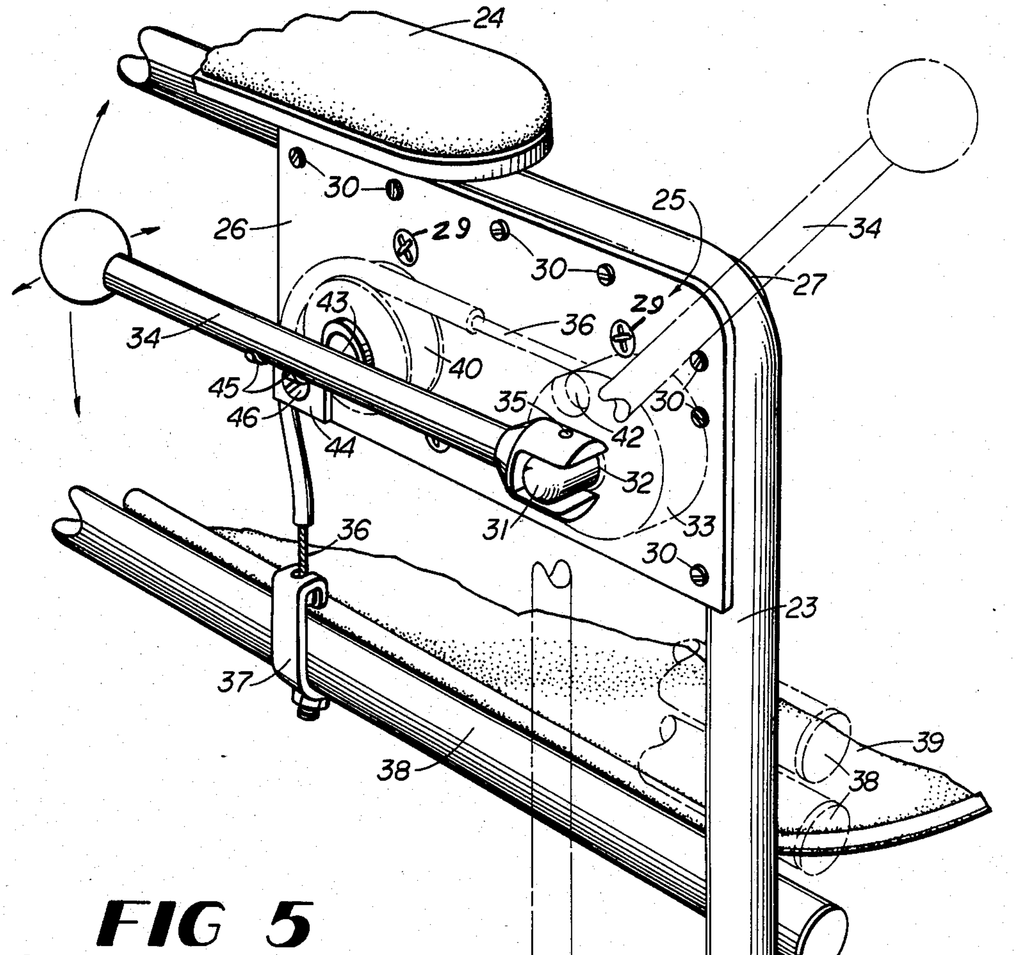
FIG. 5 is a fragmentary perspective view showing a modification of the invention.
Figure 7:
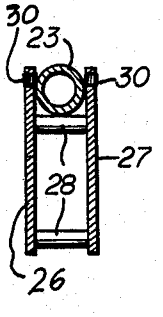
FIG. 7 is a vertical section on a reduced scale taken through the structure in FIG. 5, parts omitted.
Figure 6:
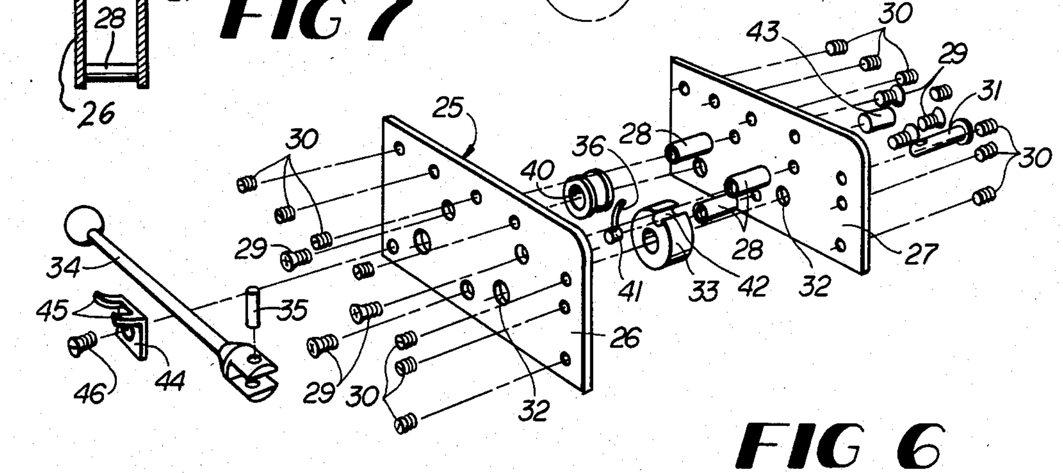
FIG. 6 is an exploded perspective view of components shown in FIG. 5.

FIGS. 5–7 of the drawings show a modification of the invention which is preferred in many cases. In this modification, one wheelchair side frame 23 carrying an arm rest 24 mounts a chair narrowing device indicated in its entirety by the numeral 25. This device or assembly comprises a pair of substantially rectangular side plates 26 and 27 disposed immediately on opposite sides of the frame 23 and being held in parallel relationship by three spacers 28 disposed therebetween, the spacers being secured to the plates 26 and 27 by screws 29. The spaced plates 26 are locked releasably to the frame 23 by a series of set screws 30 near the perimeters of the two plates 26 and 27. The set screws bear against the opposite sides of the frame 23, as shown in FIG. 5, to form a rigid and immovable assembly.

Near the forward end of the assembly 25, a rotational shaft 31 is journaled in aligned openings 32 of the plates 26 and 27 and carries a wheel 33 suitably fixed thereto between the plates 26 and 27. An operating lever 34 is pivotally connected with the end portion of the shaft 31 outwardly of plate 26 by a pin 35 which penetrates the shaft 31. Thus, the lever can be turned in a plane parallel to the plate 26 to rotate the shaft 31 and wheel 33, and the lever can also be swung toward and away from the plane occupied by the plate 26 at certain times.

A short cable 36 has one end attached removably by a clip 37 to one longitudinal seat frame bar 38 to which the usual flexible seat web 39 is attached at one edge thereof. The cable 36 is trained about an idler pulley 40 between the plates 26 and 27 near the rear of the assembly 25. From the idler pulley 40, the cable extends horizontally forwardly as shown in FIG. 5 and is connected to the wheel 33 by a cylindrical lug 41 on the cable which is received in a cylindrically curved peripheral recess 42 of the wheel. When the shaft 31 and wheel 33 are rotated in one direction by the lever or handle 34, the cable 36 will be wound on the periphery of the wheel 33. The idler pulley 40 is rotatably held on a shaft 43 between the two plates 26 and 27.

A rest bracket 44 for the lever 34 having two curved rest arms 45 is secured by a screw 46 to the outer face of the adjacent plate 26.

When the wheelchair is at its normal full width indicated by the full line illustration of the bar 38 in FIG. 5, the lever 34 is horizontal and extends rearwardly of the shaft 31 and may rest on the arms 45, as shown in full lines in FIG. 5. To narrow the wheelchair, the occupant grasps the lever 34 with one hand and rotates it upwardly and forwardly in a vertical plane and then downwardly and rearwardly. When the lever 34 is at the depending vertical position shown in phantom lines in FIG. 5, the chair is one-half narrowed as shown by the lower phantom line position of the seat frame bar 38. Continued rotation of the lever 34 rearwardly and upwardly and back to the horizontal full line position of the lever completes the narrowing of the wheelchair, indicated by the upper phantom line position of the frame bar 38. In this position of the lever 34, following a full 360° of rotation, the lever is engaged supportingly with the arms 45 so that the weight of the occupant on the seat will not cause the chair to spread or widen prematurely. When it is desired to return the chair to its normal full width, the lever 34 can be lifted and swung outwardly somewhat on the axis of pin 35 to separate the lever from the bracket arms 45, following which the lever 34 is rotated in the opposite or counterclockwise direction, FIG. 5, for 360°, thus returning the lever to its original horizontal position shown in FIG. 5.

The arrangement is simple, positive and convenient. To install the device 25 on the wheelchair, no drilling or cutting of the chair frame is involved. By having the idler pulley 40 somewhat rearwardly of the wheel 33, the lifting point defined by the clip 37 is near the center of gravity of the occupied chair and the lever 34 and wheel 33 are forwardly of the arm rest 24 and thus in a most convenient position for use by the chair occupant who may have limited arm strength.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A width adjusting attachment for a laterally folding wheelchair having a side frame including an arm rest and a vertically displaceable seat frame bar below the arm rest, said attachment comprising a pair of mounting plates arranged vertically and engaging opposite sides of said side frame near and below the arm rest and near the front of said side frame, releasable means securing said mounting plates to said side frame, a horizontal shaft journaled on said mounting plates near the forward ends thereof, a cable winding and unwinding element on said shaft between said mounting plates, an idler pulley between said mounting plates rearwardly of the cable winding and unwinding element and being journaled on the mounting plates, an anchoring element fixed to said vertically displaceable seat frame bar substantially below the idler pulley, a length of cable connected between said anchoring element and said cable winding and unwinding element, and a manual lever pivotally attached to said horizontal shaft near one mounting plate adjacent to the outer side of said side frame, said lever being swingable on its pivot axis toward and away from said side frame and also being rotatable in a vertical plane adjacent to the outer side of said side frame to turn said shaft and said cable winding and unwinding element, and a rest element for said lever on the mounting plate adjacent to the outer side of said side frame and resisting rotation of the lever in one direction.

2. A width adjusting attachment for a laterally folding wheelchair as defined in claim 1, and said lever being bifurcated at one end to receive an end portion of said shaft, and a pivot element for said shaft penetrating the bifurcated end portion of the lever and the end portion of the shaft.

3. A width adjusting attachment for a laterally folding wheelchair as defined in claim 2, and said cable winding and unwinding element comprising a cylindrical wheel having a peripheral cylindrically curved recess, and a cylindrical lug on one end of said length of cable engaging in said recess.

4. A width adjusting attachment for a laterally folding wheelchair having a side frame carrying an arm rest and a vertically displaceable seat frame bar substantially below the arm rest, said attachment comprising a manual lever attached to said side frame for rotation in a substantially vertical plane near and somewhat outwardly of the side frame, an anchoring element fixed to said seat frame bar, a cable tension force transmitting means connected between said lever and said anchoring elment, whereby manual rotation of said lever in one direction by a wheelchair occupant will cause lifting of said seat frame bar and corresponding narrowing of the wheelchair, and rotation of the lever in the opposite direction will cause lowering of the seat frame bar and returning of the folding wheelchair to its normal full width, said cable tension force transmitting means comprising a rotary cable winding and unwinding element connected with and driven by said lever, a length of cable connected between said anchoring element and said rotary cable winding and unwinding element, and an idler pulley guidably engaging said length of cable rearwardly of said winding and unwinding element and substantially above said anchoring element, whereby said cable is formed into vertical and horizontal tension force transmitting sections, a pair of spaced substantially vertical mounting plates for said lever, said cable winding and unwinding element, and said idler pulley, said mounting plates straddling said frame side and being releasably secured thereto, a series of set screws near the perimeters of said mounting plates bearing on opposite sides of said side frame to releasably secure the mounting plates thereto, spacing and connecting means between said mounting plates, and a rotary shaft carrying said cable winding and unwinding element, said lever being pivotally attached to an end portion of said shaft near one mounting plate adjacent to the outer side of said side frame, said lever being swingable toward and away from said side frame.

5. A width adjusting attachment for a laterally folding wheelchair as defined in claim 4, and a rest element for said lever on said mounting plate adjacent to the outer side of said side frame.

* * * * *